(12) United States Patent
Tripathi et al.

(10) Patent No.: US 8,224,898 B2
(45) Date of Patent: Jul. 17, 2012

(54) RELEVANCE-BASED EXPIRATION OF DATA

(75) Inventors: Ashutosh Tripathi, Hyderabad (IN); Jonathan Shriver-Blake, Seattle, WA (US); Amit Kripalani, Hyderabad (IN); Dharmanand Singh, Hyderabad (IN); Rohit Gupta, Hyderabad (IN); Shirish Koti, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 11/956,481

(22) Filed: Dec. 14, 2007

(65) Prior Publication Data

US 2009/0157810 A1      Jun. 18, 2009

(51) Int. Cl.
*G06F 17/00* (2006.01)

(52) U.S. Cl. ......... 709/204; 709/203; 709/219; 709/238

(58) Field of Classification Search .................... 709/204
See application file for complete search history.

(56) References Cited

U.S. PATENT DOCUMENTS

| | | |
|---|---|---|
| 6,185,584 B1 | 2/2001 | Paik et al. |
| 6,484,196 B1 | 11/2002 | Maurille |
| 7,260,278 B2 | 8/2007 | Zhang et al. |
| 2002/0138693 A1* | 9/2002 | Aasland .................. 711/112 |
| 2003/0220973 A1 | 11/2003 | Zhu et al. |
| 2004/0083424 A1* | 4/2004 | Kawai et al. ............. 715/501.1 |
| 2004/0103085 A1 | 5/2004 | Ly et al. |
| 2004/0205131 A1 | 10/2004 | Saruhashi et al. |
| 2005/0193010 A1 | 9/2005 | DeShan et al. |
| 2006/0053380 A1 | 3/2006 | Spataro et al. |
| 2007/0074123 A1 | 3/2007 | Omura et al. |
| 2007/0168286 A1 | 7/2007 | Nishioka et al. |
| 2010/0105481 A2* | 4/2010 | Hogan et al. ................ 463/42 |

OTHER PUBLICATIONS

"Microsoft Office Live Meeting Feature Guide", Jan. 2005, Microsoft Corporation, pp. 1-17.
"Polycom Video Media Center—VMC 1000", 2007, Polycom, Inc., pp. 2.
"Media Publisher", Media Publisher, 2007, p. 1.

* cited by examiner

*Primary Examiner* — Jeffrey Pwu
*Assistant Examiner* — Sulaiman Nooristany
(74) *Attorney, Agent, or Firm* — Hope Baldauff Hartman, LLC

(57) ABSTRACT

Technologies are described herein for relevance-based expiration of data. An initial expiration time for the data is computed based upon an expiration duration associated with the data. The expiration time for the data is periodically re-computed in order to extend the expiration time. A relevance value for the meeting data is computed and the expiration time is set as a function of the computed relevance value. The relevance value may be computed as a product of a user-settable relevance value for the meeting data and a dynamic relevance point for the meeting data. When the computed expiration time for meeting data has been reached, the meeting data is expired, such as through the deletion of the meeting data.

19 Claims, 8 Drawing Sheets

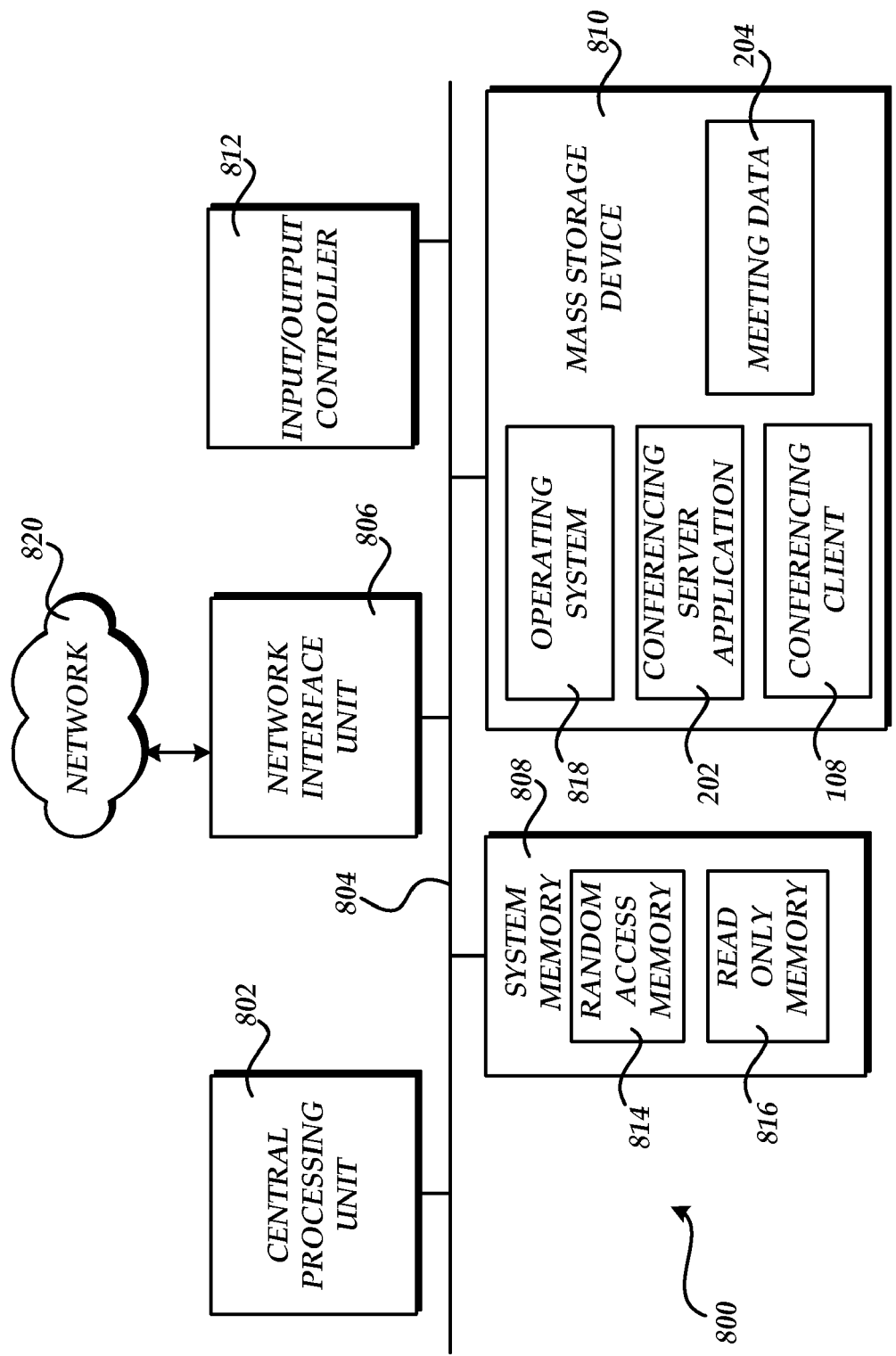

RELEVANCE-BASED EXPIRATION OF DATA

BACKGROUND

Hosted World Wide Web ("Web") conferencing services allow users to meet and collaborate over the Internet. In particular, users can upload documents to a server computer operated by the provider of the hosted conferencing service and share the documents among the meeting participants. Users can also annotate the documents as they are presented. Functionality is also typically provided for making a recording of a hosted meeting, which often includes generating an audio/visual recording of the presented documents, annotations, and potentially other audio and video information. The meeting data, including the meeting content and the meeting recording, are stored at the server computer operated by the provider of the hosted conferencing service.

Meeting data stored by hosted conferencing service providers can consume a large amount of storage space. Because large quantities of mass storage is expensive to purchase and to operate, hosted conferencing service providers often desire to delete the stored meeting data as quickly as possible after a meeting has occurred. In order to accomplish this, hosted conferencing service providers often specify a fixed period of time after which all meeting data is deleted. For instance, a hosted conferencing service provider may specify that all meeting data is deleted 30 days after a meeting has been held.

In contrast to the desire of the hosted conferencing service providers to delete meeting data as soon as possible is the strong need of users to reuse the meeting data. For instance, it is very common for users to view the recording of a meeting for many weeks or even months after a meeting has occurred. However, the common policy of hosted conferencing service providers to delete meeting data after a fixed period of time often results in the deletion of meeting data that is still useful and relevant to users. It can be very frustrating for a user to attempt to view a meeting recording only to discover that the hosted conferencing service provider has deleted the meeting data.

It is with respect to these considerations and others that the disclosure made herein is presented.

SUMMARY

Technologies are described herein for relevance-based expiration of meeting data. In particular, through the implementation of the technologies and concepts presented herein, meeting data stored by a hosted conferencing service provider can be expired based upon its relevance rather than through the use of a policy that mandates deletion after a fixed period of time. By expiring meeting data based upon its relevance, highly relevant meeting data may be persisted indefinitely while irrelevant meeting data is expired more quickly.

According to one aspect presented herein, a hosted conferencing server computer is disclosed that is configured to provide functionality for collaborating over a network, such as the Internet. In particular, meeting participants can upload documents to the server computer and share the documents with other meeting participants. An audio/visual recording may also be created of meetings. The hosted conferencing server computer stores the meeting data, including the meeting content and the meeting recording.

According to other aspects, the hosted conferencing server computer expires stored meeting data based upon its relevance. In particular, in one implementation, an initial expiration time for the meeting data is computed based upon an expiration duration associated with the meeting data. The expiration duration defines the minimum amount of time that should elapse prior to expiring the meeting data. The expiration duration for the meeting data may be pre-defined and associated with the meeting data through a customer license or in another manner.

The expiration time for the meeting data may be periodically re-computed in order to extend the expiration time for the meeting data. In particular, in one implementation, a relevance value for the meeting data is computed and the expiration time is set as a function of the computed relevance value. When the computed expiration time for meeting data has been reached, the meeting data is expired, such as through the deletion of the meeting data.

According to implementations, the relevance value is computed as a product of a user-settable relevance value for the meeting data and a dynamic relevance point for the meeting data. The user-settable relevance value is a variable that defines the relevance of the meeting data from the perspective of the owner of the meeting data. A lower number reflects a lower relevance while a higher number reflects a higher relevance. The dynamic relevance point is computed as a function of the frequency with which the meeting content was accessed since the previous time the expiration time was re-computed. In this manner, the relevance value takes into account the actual relevance of the meeting data as defined by the frequency at which it has been accessed along with the opinion of the owner of the meeting data regarding its relevance.

In one implementation, the expiration time for the meeting data is computed as a function of the time of last access for the meeting data. In particular, the hosted conferencing server computer computes the new expiration time by multiplying the computed relevance value for the meeting data by the expiration duration and adding the result to the time of last access for the meeting data. In another implementation, the expiration time for the meeting data is computed as a function of the previously calculated expiration time. In particular, the hosted conferencing server computer computes the new expiration time by multiplying the computed relevance value for the meeting data by the expiration duration and adding the result to the previously calculated expiration time.

It should be appreciated that although the concepts presented herein are described in the context of meeting data, these concepts may be applied to expire any type of data based upon its relevance. It should also be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 is a computer architecture diagram showing an illustrative computer hardware and software architecture for a computing system capable of implementing aspects of the embodiments presented herein.

DETAILED DESCRIPTION

Figure 1:
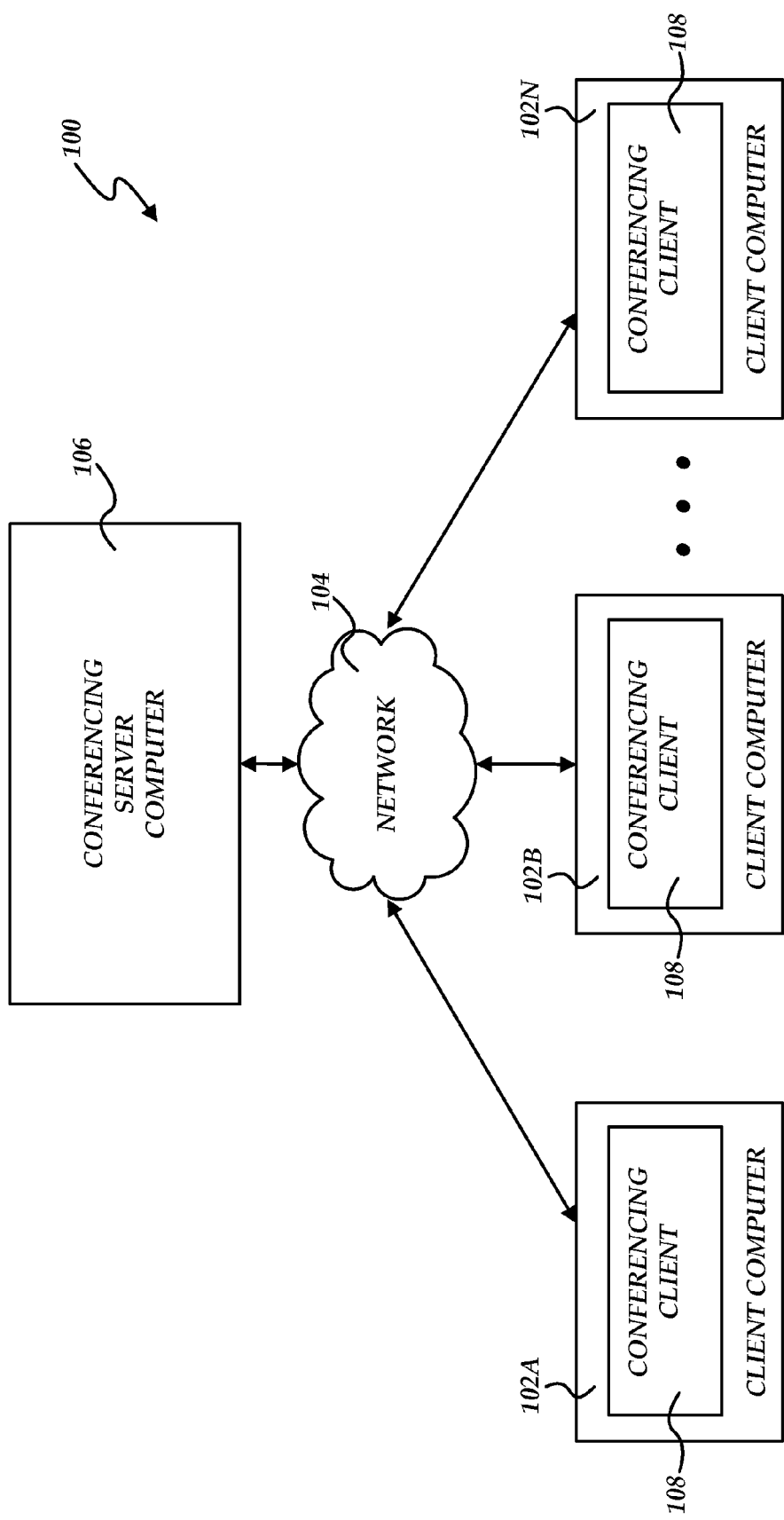
FIG. 1 is a network diagram showing aspects of an illustrative operating environment and several software components provided by the embodiments presented herein.

The following detailed description is directed to technologies for relevance-based expiration of data. Through the use of the technologies and concepts presented herein, the time at which data is expired is computed as a function of the relevance of the data. In this manner, highly relevant data may be persisted indefinitely, while less relevant data may be expired more quickly. The following discussion is presented in the context of a hosted conferencing server computer that is configured to expire meeting data based upon its relevance. It should be appreciated, however, that the concepts presented herein may be utilized by virtually any type of computing system to expire virtually any type of content based upon its computed relevance.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for relevance-based expiration of data will be described.

Turning now to FIG. 1, details will be provided regarding an illustrative operating environment and several software components provided by the embodiments presented herein. In particular, FIG. 1 illustrates aspects of a hosted conferencing service 100. The hosted conferencing service 100 provides an operating environment for the particular embodiments presented herein. It should be appreciated, however, that the technologies and concepts presented herein for expiring content based on relevance may be utilized in other environments and to expire other types of data.

The hosted conferencing service 100 illustrated in FIG. 1 includes several client computers 102A-102N connected to a conferencing server computer 106 via network 104. Each of the client computers 102A-102N comprises a standard desktop or laptop computer capable of executing an operating system and a conferencing client 108. The conferencing client 108 comprises an application program operative to communicate with the conferencing server computer 106. Together, the conferencing client 108 and the conferencing server computer 106 provide facilities for allowing users of the client computers 102A-102N to participate in an online hosted conference (also referred to herein as a "meeting").

According to various embodiments, the conferencing server computer 106 is configured to execute software components for allowing the users of the client computers 102A-102N to meet and collaborate in a shared workspace. In particular, a user may be permitted to upload documents to the conferencing server computer 106 and to share the documents among the operators of the client computers 102A-102N. Additional functionality may be permitted for allowing the users to annotate documents as they are presented. The conferencing server computer 106 may also provide functionality for making a recording of a hosted meeting. This process often includes generating an audio, visual, or audio/visual recording of the events taking place during the meeting. Recording may include recording the presented documents, the annotations made by meeting participants, and potentially the audio or video presented by a user of one or all of the client computers 102A-102N. As will be discussed in greater detail below, the meeting data, which includes the presented meeting content stored at the conferencing server computer 106 and the meeting recording, are stored at the conferencing server computer 106. In order to intelligently expire this content, the conferencing server computer 106 computes the relevance of this content and expires the content based on the computed relevance. Details regarding this process will be provided below with regard to FIGS. 2-7.

Figure 2:
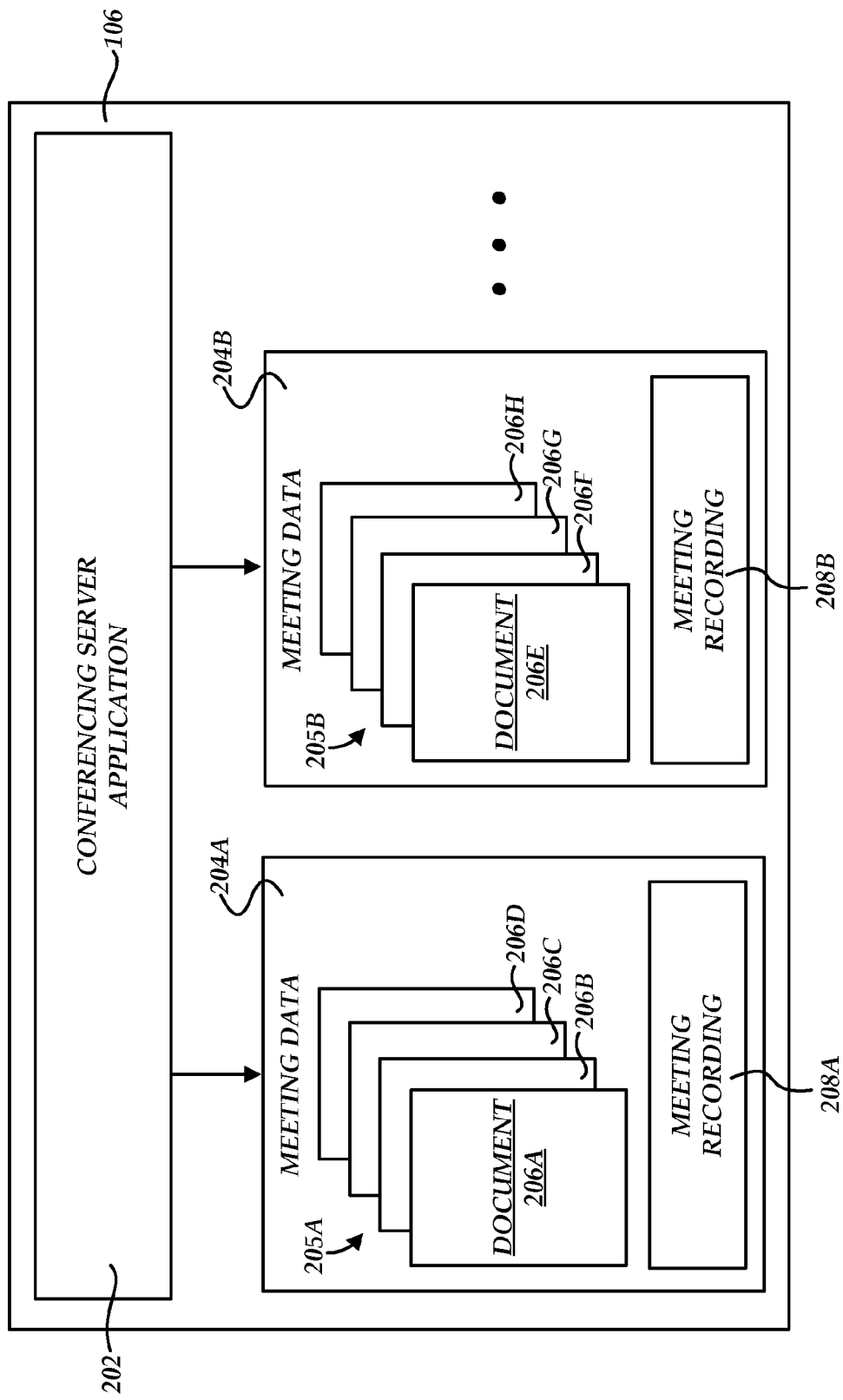
FIG. 2 is a software architecture diagram showing aspects of a conferencing server computer provided in one embodiment described herein.

Referring now to FIG. 2, additional details regarding the operation of the conferencing server computer 106 will be provided. In particular, FIG. 2 is a software architecture diagram showing aspects of the software components utilized on the conferencing server computer 106. In this regard, the conferencing server computer 106 executes the conferencing server application 202. The conferencing server application 202 controls all aspects of the operation of the conferencing server computer 106, including communicating with the conferencing client 108 executing on each of the client computers 102A-102N. As discussed above with respect to FIG. 1, the conferencing server application 202 provides functionality for allowing users to engage in an online hosted conference, including the presentation of documents and creating a recording of the conference.

As also discussed briefly above with respect to FIG. 1, the conferencing server computer 106 stores meeting data for each meeting that is hosted by the conferencing server computer 106. For instance, as shown in FIG. 2, the meeting data 204A for a particular meeting may include meeting content 205A, such as the documents 206A-206D. The meeting data 204A may also include the meeting recording 208A. As discussed above, the meeting recording 208A may comprise an audio, visual, or audio/visual recording of the actual meeting hosted by the conferencing server computer 106. It should be appreciated that meeting data is stored on a per meeting basis. As a result, therefore, the meeting data 204B may include meeting content such as the documents 206E-206H and the meeting recording 208B for another meeting. Meeting data for other meetings may be stored in a similar manner by the conferencing server computer 106.

It should be appreciated that the documents 206A-206H are generally provided by the operators of the client computers 102A-102N. For instance, an operator of the client computer 102A may desire to present a word processing document to the other meeting participants. In this regard, the conferencing client 108 provides functionality for allowing a user of the client computer 102A to submit the word processing document to the conferencing server computer 106. Virtually any other type of document may also be submitted to the conferencing server computer 106 for presentation during a hosted meeting. For instance, spreadsheet documents, presentation documents, graphical image files, and other types of documents may be submitted to the conferencing server computer 106 for presentation during a hosted meeting. These documents 206 are stored with the meeting data 204A-204B in the manner described above.

As will be discussed in greater detail below, the conferencing server application 202 is also operative to expire the meeting data 204A-204B based on the relevance of the meeting data 204A-204B. As used herein, the term "expire" refers to the process of making the meeting data 204A-204B unavailable to users of the client computers 102A-102N. For instance, the meeting data 204A-204B may be deleted, taken offline, backed up to another type of medium for archival, or otherwise made unavailable. FIGS. 3-7 further illustrate processes performed by the conferencing server application 202 in one embodiment for expiring the meeting data 204A-204B based upon its computed relevance.

Figure 3:
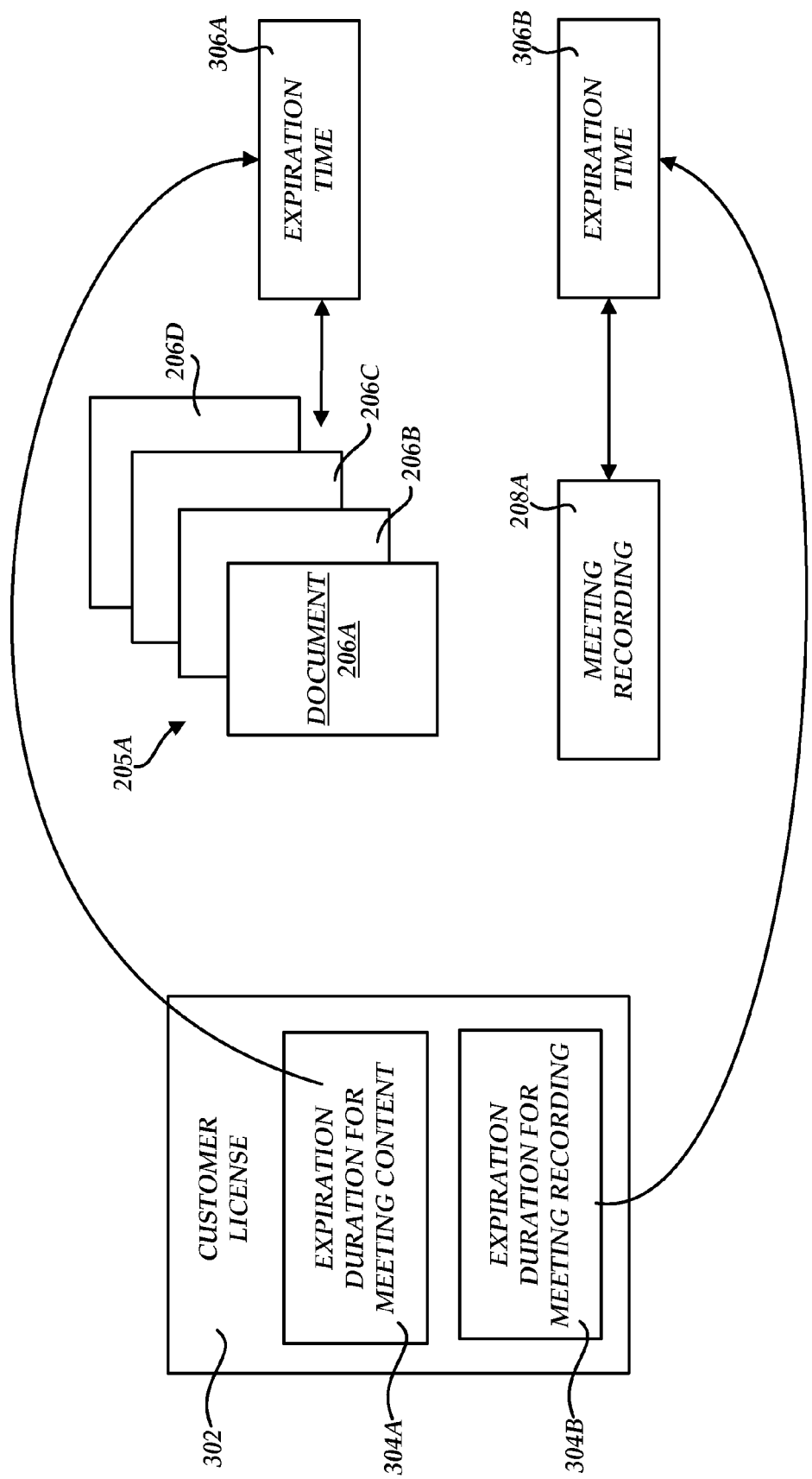
FIG. 3 is a data structure diagram showing aspects of a customer license and one methodology for relevance-based expiration of meeting data presented herein.

Turning now to FIG. 3, additional details will be provided regarding one embodiment presented herein for expiring the meeting data 204A based on its relevance. As shown in FIG. 3, a customer license 302 may be utilized to define the terms of the provision of the services provided by the hosted conferencing service 100. In addition to the standard terms of the customer license 302, the customer license 302 may define an expiration duration for the meeting data 204A. The expiration duration represents the minimum amount of time that should elapse prior to expiring the meeting data 204A. As will be discussed in greater detail below, while the expiration duration is initially defined by the customer license 302, the expiration duration may be modified by an administrator or by a user of one of the client computers 102A-102N.

As also illustrated in FIG. 3, a separate expiration duration may be set for meeting content 205A and for a meeting recording 208A. For instance, in the embodiment illustrated in FIG. 3, an expiration duration 304A has been specified by the customer license 302 for the meeting content 205A. The meeting content 205A includes the documents 206A-206D. The expiration duration 304A specifies the minimum expiration time 306A that should elapse prior to expiration of the meeting content 205A. Similarly, the expiration duration 304B specifies the expiration time 306B of the meeting recording 208A. In this manner, the meeting content 205A and meeting recordings 208A can be expired independently from one another. Additional details regarding this process are provided below with respect to FIGS. 4-7.

Figure 4:
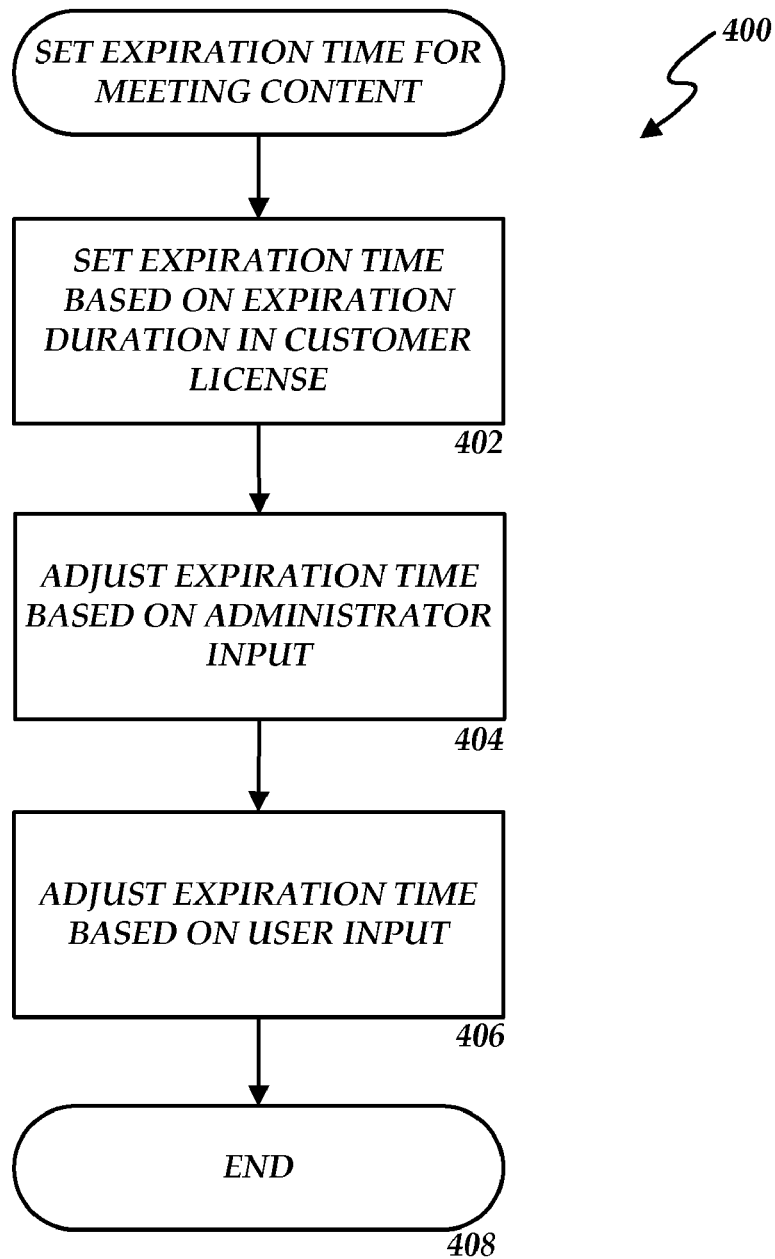
FIGS. 4-7 are flow diagrams illustrating aspects of various processes described herein in embodiments for relevance-based expiration of meeting data.

Referring now to FIG. 4, additional details will be provided regarding the embodiments presented herein for relevance-based expiration of data. In particular, FIG. 4 is a flow diagram illustrating aspects of the operation of the conferencing server computer 106 for setting an initial expiration time for the meeting data 204A. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where the conferencing server application 202 sets an initial expiration time for the meeting data 204A based on the expiration duration 304A-B set forth in the customer license 302. As described above with respect to FIG. 3, an expiration duration 304A may be set for the meeting content 205A and an expiration duration 304B may be set for the meeting recording 208A.

Once the initial expiration time has been set at operation 402, the routine 400 continues to operation 404, where the initial expiration time may be adjusted based upon an administrator's input. For instance, if the initial expiration duration specified that content should be persisted for no less than 30 days from the time of its last access, an administrator may be permitted to reduce this number, for instance, such that meeting content is expired no less than 20 days after its last access. Once this has occurred, the routine 400 continues to operation 406, where a user of one of the client computers 102A-102N is also permitted to adjust the initial expiration time. For instance, a creator of a hosted meeting utilizing the client computer 102A may be permitted to specify an expiration time less than the expiration duration set forth in the customer license 302. Once the initial expiration time has been set, the routine 400 continues to operation 408, where it ends.

Figure 5:
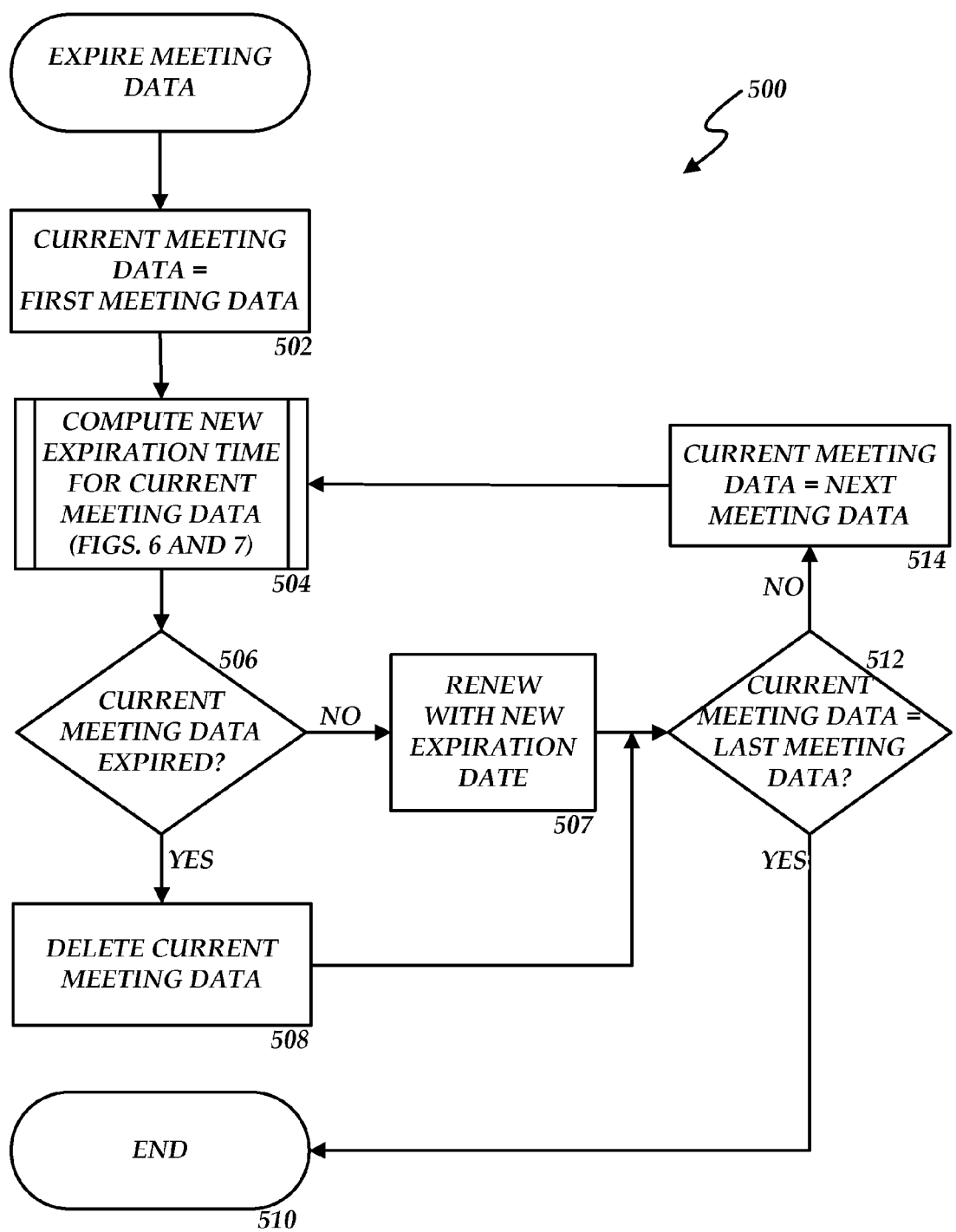

Referring now to FIG. 5, details regarding an illustrative routine 500 provided herein for expiring the meeting data 204 based on its relevance will be described. As discussed briefly above, the expiration time 306 for meeting data 204 is periodically adjusted based upon the relevance of the meeting data 204. In particular, the routine 500 may be performed for meeting data 204 that is scheduled to expire immediately or on another periodic basis. Through the operations performed by the routine 500, the expiration time 506 for meeting data 204 is recomputed, taking the relevance of the meeting data 204 into consideration.

The routine 500 begins at operation 502, where a temporary variable is utilized to identify the current meeting data 204 that is being considered. At operation 502, this variable is also set equal to the first meeting data 204 to be considered by the routine 500. The routine 500 then continues from operation 502 to operation 504, where a new expiration time is computed for the current meeting data. One routine for computing the new expiration time as a function of the time of last access of the meeting data 204 will be described below with reference to FIG. 6. In an alternative embodiment, the new expiration time is computed as a function of the last computed expiration date for the meeting data 204. A routine illustrating this process will be described below with respect to FIG. 7.

Once the new expiration time 306 has been computed for the current meeting data 204, the routine 500 continues to operation 506. At operation 506, a determination is made as to whether the current meeting data 204 has expired based on the newly computed expiration time. The current meeting data 204 will be considered to have expired if the newly computed expiration time is in the past. If the current meeting data 204 has expired, the routine 500 continues from operation 506 to operation 508, where the current meeting data 204 is expired.

If, at operation 506, it is determined that the current meeting data 204 has not expired based on the newly computed expiration time 506, the routine 500 branches from operation 506 to operation 507. At operation 507, the expiration time 506 of the current meeting data 204 is updated with the newly computed expiration time. The routine 500 then continues to operation 512, where a determination is made as to whether any additional meeting data 204 should be considered. If no additional meeting data 204 is to be considered, the routine 500 branches to operation 510, where it ends. If additional meeting data is to be considered, the routine 500 branches to operation 514 where the variable utilized to identify the current meeting data is set equivalent to the next meeting data 204 to be considered. The routine 500 then returns from operation 514 to operation 504 where a new expiration time is computed for the current meeting data in the manner described above.

Figure 6:
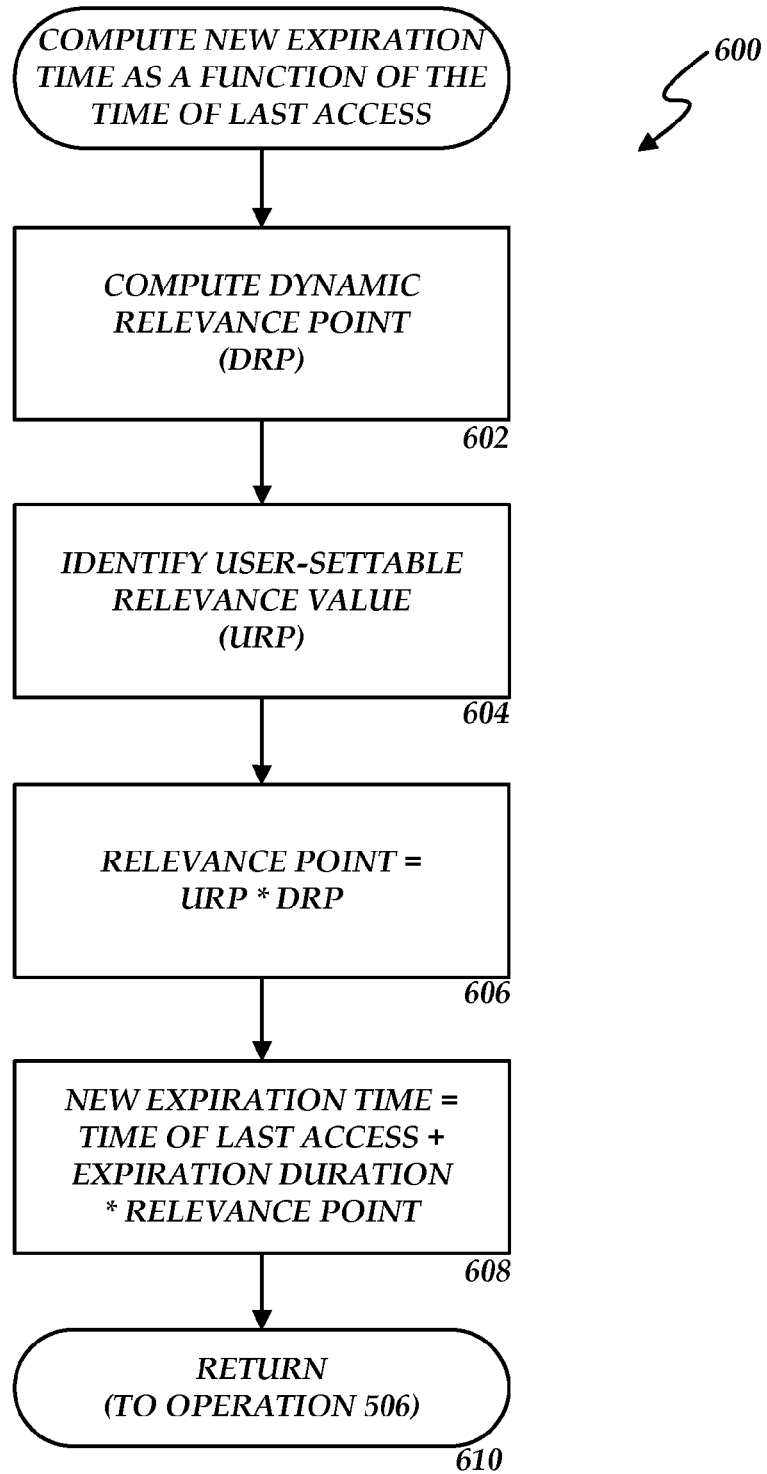

Referring now to FIG. 6, an illustrative routine 600 will be described showing a process performed by the conferencing server application 202 for computing the new expiration time for the meeting data 204 as a function of the time at which the meeting data 204 was last accessed. The routine 600 begins at operation 602, where the conferencing server application 202 computes a dynamic relevance point ("DRP"). The dynamic relevance point is a numeric value that is calculated as a function of the frequency at which the meeting data 204 is accessed. In particular, according to one implementation, the dynamic relevance point is zero if the meeting data has not been accessed since the previous computation of an expiration date, the logarithm of the number of accesses of the meeting data 204 since the last computer of the expiration date if the number of accesses is greater than one, and the logarithm of the number of accesses divided by two if the number of accesses since the last computation of the expiration date is equal to one. It should be appreciated that the dynamic relevance point function described herein is illustrative and that other functions of the frequency of access of the meeting data 204 may be utilized to compute the value of the dynamic relevance point.

Once the dynamic relevance point has been computed, the routine 600 continues from operation 602 to operation 604. At operation 604, the conferencing server application 202 identifies a user settable relevance value ("URP"). The user settable relevance value is a numeric value that defines the relevance of the meeting data 204 from the perspective of an initiator of the meeting. A lower number reflects a lower relevance, while a higher number reflects a higher relevance. For instance, in one implementation, a user of one of the client computers 102A-102N may set the user settable relevance value to a number between zero and three. The numeral zero will be utilized to specify a quick expiration of the meeting data 204 while the numbers one, two, and three will cause the meeting data 204 to be retained for increasing periods of time. A user may be prompted for the user settable relevance value at the time a new meeting is created.

Once the user settable relevance value has been identified, the routine 600 continues to operation 606 where a relevance point, also referred to herein as a relevance value, is computed for the meeting data 204. In one embodiment, the reference point is computed by multiplying the dynamic relevance point by the user settable relevance value. The relevance point utilizes the actual computed relevance of the meeting data 204 as specified by the dynamic relevance point and the owner's opinion of the relevance of the meeting data 204 as specified by the user settable relevance value to compute an overall relevance for the meeting data 204.

Once the relevance point has been computed for the meeting data 204, the routine 600 continues to operation 608, where the new expiration time for the meeting data 204 is computed. In the implementation illustrated in FIG. 6, the new expiration time is computed as a function of the time at which the meeting data 204 was last accessed by one of the client computers 102A-102N. In particular, in this implementation, the new expiration time is computed by adding the time of last access of the meeting data 204 to the product of the expiration duration 304 and the relevance point computed at operation 606. Once the new expiration time has been computed, the routine 600 continues to operation 610, where it returns to the operation 506, described above with reference to FIG. 5.

Figure 7:
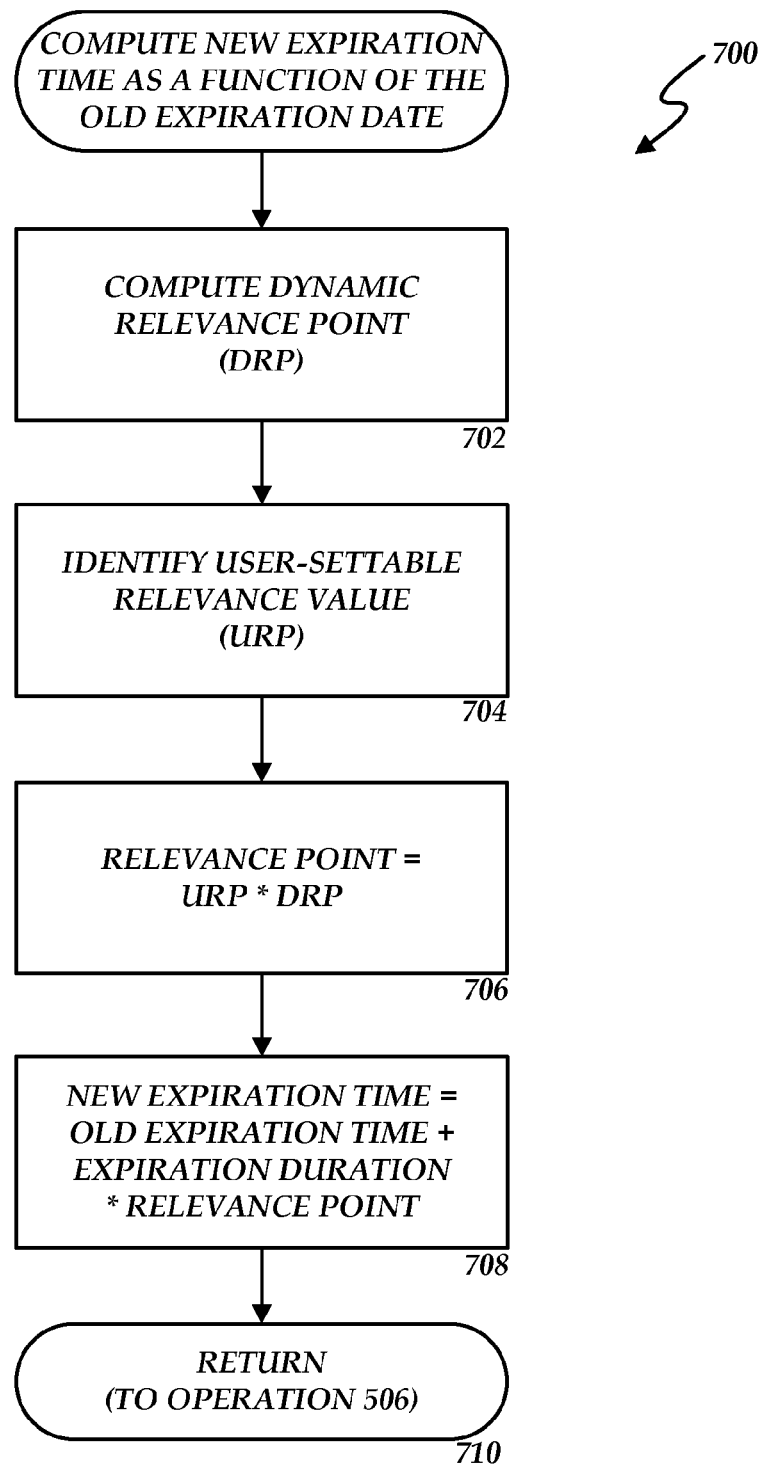

Referring now to FIG. 7, another embodiment of the invention will be described wherein the new expiration time is computed as a function of the most recently computed expiration date for the meeting data 204. In particular, FIG. 7 illustrates a routine 700 performed by the conferencing server application 202 for computing the new expiration time. The routine 700 begins at operation 702, where the dynamic relevance point for the meeting data 204 is computed in the manner described above with reference to FIG. 6. Once the dynamic relevance point has been computed, the routine 700 continues to operation 704 where the conferencing server application 202 identifies the user settable relevance value. The user settable relevance value was previously discussed above with reference to FIG. 6. Once the user settable relevance value has been identified, the routine 700 continues to operation 706, where the relevance point for the meeting data 204 is computed by multiplying the dynamic relevance point by the user settable relevance value.

Once the relevance point has been computed for the meeting data 204, the new expiration date for the meeting data 204 is computed at operation 708. In this implementation, the new expiration time is computed by adding the product of the expiration duration and the relevance point to the previously computed expiration time for the meeting data 204. In this manner, the new expiration time for the meeting data 204 is computed as a function of both the relevance of the meeting data 204 and the previous expiration time for the meeting data 204. Once the new expiration time has been computed at operation 708, the routine 700 continues to operation 710 where it returns to operation 506, described above with reference to FIG. 5.

It should be appreciated that, although the implementations illustrated in FIGS. 6 and 7 describe computing the new expiration time for the meeting data 204, these routines may also be utilized to compute expiration times for the meeting content 205 and the meeting recording 208 independently. For instance, as described above with reference to FIG. 3, an expiration duration 304 may be set individually for both the meeting content 205A and the meeting recording 208A. Additionally, the user settable relevance value may also be specified independently for the meeting content 205A and the meeting recording 208A. In this manner, the routines discussed above with reference to FIGS. 6 and 7 may be utilized to compute a new expiration time for the meeting content 205 and the meeting recording 208 independently of one another.

FIG. 8 shows an illustrative computer architecture for a computer 800 capable of executing the software components described herein for relevance-based expiration of data in the manner presented above. The computer architecture shown in FIG. 8 illustrates a conventional desktop, laptop, or server computer and may be utilized to execute any aspects of the software components presented herein described as executing on the conferencing server computer 106 or the client computers 102A-102N.

The computer architecture shown in FIG. 8 includes a central processing unit 802 ("CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 818, application programs, and other program modules, which are described in greater detail herein.

The mass storage device 810 is connected to the CPU 802 through a mass storage controller (not shown) connected to the bus 804. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available computer storage media that can be accessed by the computer 800.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800.

According to various embodiments, the computer 800 may operate in a networked environment using logical connections to remote computers through a network such as the network 820. The computer 800 may connect to the network 820 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 818 suitable for controlling the operation of a networked desktop, laptop, or server computer. The mass storage device 810 and RAM 814 may also store one or more program modules. In particular, the mass storage device 810 and the RAM 814 may store the conferencing server application 202, the conferencing client 108, and the meeting data 204, each of which was described in detail above with respect to FIGS. 1-7. The mass storage device 810 and the RAM 814 may also store other types of program modules.

Based on the foregoing, it should be appreciated that technologies for relevance-based expiration of data are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for relevance-based expiration of data, the method comprising computer-implemented operations for:
   storing the data;
   computing a relevance value for the data, the relevance value comprising a user-settable relevance value for the data and a dynamic relevance point for the data;
   determining an expiration time for the data based upon the computed relevance value for the data; and
   re-computing the relevance value for the data;
   updating the expiration time for the data based upon the re-computed relevance value for the data; and
   expiring the data after the determined expiration time.

2. The method of claim 1, wherein computing a relevance value for the data comprises:
   identifying the user-settable relevance value for the data;
   computing the dynamic relevance point for the data; and
   multiplying the user-settable relevance value for the data by the dynamic relevance point for the data to compute the relevance value for the data.

3. The method of claim 2, wherein the dynamic relevance point is computed as a function of a frequency of access of the data.

4. The method of claim 3, wherein the data comprises meeting content and a meeting recording.

5. The method of claim 3, wherein expiring the data comprises deleting the data.

6. The method of claim 3, wherein determining an expiration time for the data based upon the computed relevance value for the data comprises:
   defining an expiration duration for the data, the expiration duration defining the minimum amount of time that should elapse prior to expiring the data; and
   computing the expiration time for the data by multiplying the computed relevance value for the data by the expiration duration and adding a time that the data was last accessed.

7. The method of claim 6, wherein the expiration duration is initially defined by a license.

8. The method of claim 3, wherein determining an expiration time for the data based upon the computed relevance value for the data comprises:
   defining an expiration duration for the data, the expiration duration defining the minimum amount of time that should elapse prior to expiring the data; and
   computing the expiration time for the data by multiplying the computed relevance of the data by the expiration duration and adding a previously calculated expiration time.

9. The method of claim 8, wherein the expiration duration is initially defined by a license.

10. A computer storage medium having computer executable instructions stored thereon which, when executed by a computer, cause the computer to:
    store meeting data comprising content for a meeting and a recording of the meeting;
    compute an initial expiration time for the meeting data based upon an expiration duration associated with the meeting data;
    periodically re-compute the expiration time by determining a relevance value for the meeting data and setting the expiration time as a function of the relevance value, the relevance value comprising a user-settable relevance value for the data and a dynamic relevance point for the data; and expire the meeting data after the expiration time.

11. The computer storage medium of claim 10, wherein determining a relevance value for the meeting data comprises:

identifying the user-settable relevance value for the meeting data;

computing the dynamic relevance point for the meeting data; and multiplying the user-settable relevance value for the meeting data by the dynamic relevance point for the meeting data to compute the relevance value for the meeting data.

12. The computer storage medium of claim 11, wherein the dynamic relevance point is computed as a function of a frequency of access of the meeting data.

13. The computer storage medium of claim 12, wherein setting the expiration time as a function of the relevance value comprises computing the expiration time for the meeting data by multiplying the computed relevance value for the meeting data by the expiration duration and adding a time that the meeting data was last accessed.

14. The computer storage medium of claim 12, wherein setting the expiration time as a function of the relevance value comprises computing the expiration time for the meeting data by multiplying the computed relevance of the meeting data by the expiration duration and adding a previously calculated expiration time.

15. The computer storage medium of claim 12, wherein expiring the meeting data comprises deleting the meeting data.

16. A method for relevance-based expiration of meeting data, the method comprising:

storing meeting data at a conferencing server computer, the meeting data comprising content for a meeting and a recording of the meeting;

storing a license at the conferencing server computer, the license defining an expiration duration for the meeting data;

computing an initial expiration time for the meeting data, the initial expiration time based upon the expiration duration;

periodically re-computing the expiration time for the meeting data by identifying a user-settable relevance value for the meeting data, computing a dynamic relevance point for the meeting data, multiplying the user-settable relevance value for the meeting data by the dynamic relevance point for the meeting data to compute a relevance value for the meeting data, and setting the expiration time for the meeting data as a function of the computed relevance value; and expiring the meeting data after the computed expiration time.

17. The method of claim 16, wherein setting the expiration time for the meeting data as a function of the computed relevance value comprises setting the expiration time for the meeting data to a time defined by the product of the computed relevance value for the meeting data and the expiration duration added to a time that the meeting data was last accessed.

18. The method of claim 16, wherein setting the expiration time for the meeting data as a function of the computed relevance value comprises setting the expiration time for the meeting data to a time defined by the product of the computed relevance of the meeting data and the expiration duration added to a previously calculated expiration time.

19. The method of claim 16, wherein a first expiration time is computed for the content and wherein a second expiration time is computed for the recording.

* * * * *